July 9, 1946. N. BARBIERI 2,403,780
MOLD FOR MOLDING AN EXTENSIBLE ARTICLE
Filed March 16, 1944
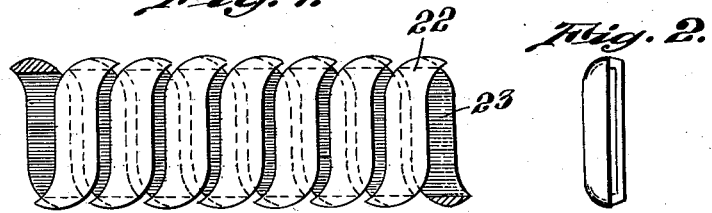
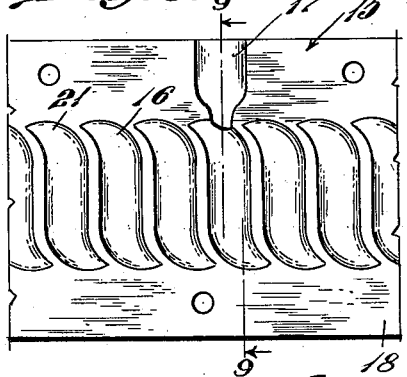
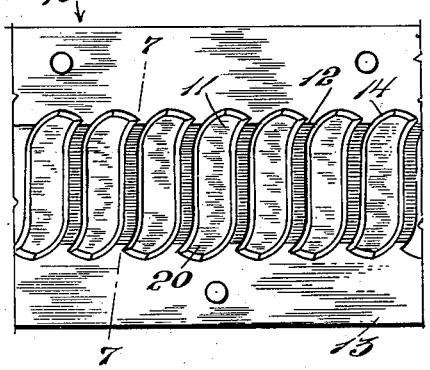
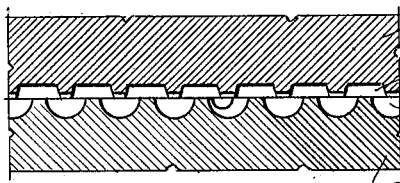
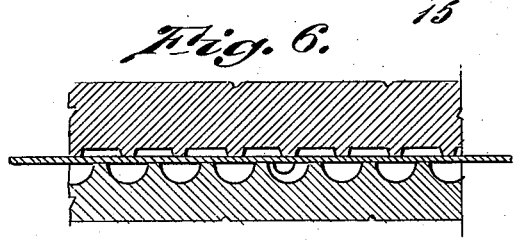
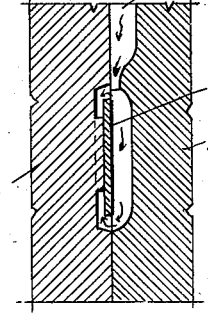
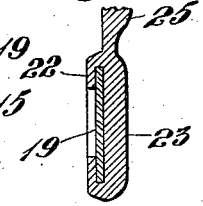
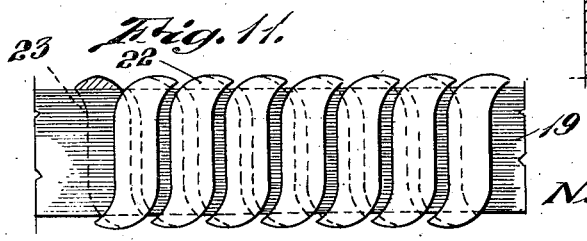
INVENTOR
Nicholas Barbieri
BY Barlow & Barlow
ATTORNEYS Patented July 9, 1946

2,403,780

UNITED STATES PATENT OFFICE 2,403,780

MOLD FOR MOLDING EXTENSIBLE ARTICLES

Nicholas Barbieri, Providence, R. I., assignor to Uncas Manufacturing Company, a corporation of Rhode Island Application March 16, 1944, Serial No. 526,779

1 Claim. (Cl. 18—42)

This invention relates to a mold for an extensible article such for instance as a bracelet formed of plastic material.

Plastic bracelets have been formed of one integral piece of material, such for instance as in the form of a band, or in sections connected together by some other means, such for instance as metal parts, hinges, elastic bands, or the like, when one part is designed to move relative to another. The formation of separate parts and attaching them together is a laborious and painstaking work and results in a correspondingly expensive article when completed.

One of the objects of this invention is to provide by molding in a single piece an extensible bracelet and the formation of a mold which will accomplish this result.

Another object of this invention is to provide a mold the recesses of which form the shape of the article which is exposed to view, and which recesses may be varied in shape that various appearances may be had in the article which is taken from the mold.

Another object of this invention is to provide a mold which will have a removable strip or bar which acts as a core for the article molded so that articles somewhat in the form of a helix or a flattened helix may be formed when desired with the center portion which forms into shape the parts about the core removable from the finished construction.

Another object of this invention is to provide a mold suitable for injection wherein the plastic material which is molded is forced into the mold under heat and pressure or under heat and then allowed to cool and set into the form desired.

With these and other objects in view, the invention consists of certain novel features of construction, as will be more fully described and particularly pointed out in the appended claim.

In the accompanying drawing:

Fig. 1 is a top plan view of the article which is desired to be molded;

Fig. 2 is an edge view thereof;

Fig. 3 is a face view of one of the dies of the mold;

Fig. 4 is a face view of the companion die;

Fig. 5 is a central sectional view of the dies shown in Figs. 3 and 4 positioned together face to face;

Fig. 6 is a section similar to Fig. 5 illustrating the removable strip or bar which is positioned between the two dies;

Fig. 7 is a sectional view substantially on line 7—7 of Fig. 4 and illustrating the recess for the strip or bar;

Fig. 8 is a view of the bar;

Fig. 9 is a section on line 9—9 of Fig. 3 showing the gate to the recesses;

Fig. 10 is a sectional view with the casting removed from the die;

Fig. 11 is a plan view of the casting with the gate removed and taken from the die but showing the strip material in position in the cast product.

In proceeding with this invention I provide recesses in the faces of two dies which are brought together with the removable core between so that when the core is in position the connection between the recesses will follow substantially the path of a distorted or flattened helix. After injecting into such recesses a plastic material and allowing the same to set the die parts may be removed leaving the helix cast about the core. The core may then be removed leaving the flattened distorted helix in the form desired.

With reference to the drawing, 10 designates one die, shown in Figs. 4, 5, and 7, which is provided with a plurality of recesses 11 of the depth shown more clearly in Fig. 5 with shallower recesses 12, shown more clearly in Fig. 7, both formed in the faces 13 of the die 10. The recesses 11 have a peripheral outline as illustrated best in Fig. 4 with a bevel 14 along the edges of each of the recesses.

The die 15 as shown in Figs. 3 and 5 is provided with a plurality of recesses 16 which are shaped as best shown in Fig. 3, each separated one from the other. A gate 17 is also in the face 18 of this die. This face 18 is grooved for contact with the face 13, both being ground flat so as to provide good mating surfaces. A removable strip of ribbon-like form designated 19, and shown in section in Figs. 6 and 8, is of a thickness substantially the depth of the recess 12 so as to lie therein and separate the main portions of the recesses 11 and 16 in the opposite faces of the dies 10 and 15.

The recesses 11 are arranged at an angle to the edges of the strip or bar 19 or else have their ends 20 offset from the body portion of the recess which extends at right angles to the edges of the bar 19, which provides a functional reason for the shape shown in Fig. 4.

The shape of the recesses 16 in the die 15 also have a functional value in that the end portions 21 of these recesses 16 also extend at an angle to the edges of the strip 19. The effect of this arrangement is such that the end portions 20 of the recesses 11 connect with the end portions of the recesses 16 when the dies 10 and 15 are placed together as shown in Figs. 5 and 6 particularly as illustrated in Fig. 9. Thus the arrangement is such that the end portions of the recess 16 will connect one end portion of a recess 11 with the end portion at the opposite side of the mold of the next recess 11 and progressively this connection occurs somewhat after the manner of a distorted or flattened helix so that a cork screw-like passage about the strip 19 as a core is formed from one end of the die to the other.

In molding, the plastic material to be molded, which is used in an injection mold, is inserted through the gate 17 and will exude in both directions as shown in Fig. 9 until the recesses are completely filled and a formation about the central strip 19 providing portions 22 and 23, such as shown in Fig. 11, is provided. The mold is then allowed to set and after the material is hardened the two dies 10 and 15 are separated, the gate 25 is removed from position and the strip 19 is removed from the center of the molded structure providing the finished form of the article.

The construction follows the shape of a flattened helix and is extendible in the direction of its length by a certain resiliency which is inherent in the material of which it is molded.

I claim:

A mold comprising a pair of dies with faces in contact with each other, each face having a series of recesses, the dividing walls of the two series of recesses being out of alignment with each other, a removable strip of ribbon-like form, rectangular in cross section and having a smooth unbroken surface extending between said dies separating the mid portions of said recesses and leaving the end portions of one recess opening into the end portions of two adjacent recesses in the face of the opposite die and the two series of recesses being so shaped and disposed as to form together with said strip a continuous substantially flattened helical path in said pair of dies.

NICHOLAS BARBIERI.